Oct. 30, 1934.  F. MEIWALD  1,978,591
ELECTRIC CABLE
Filed March 18, 1933
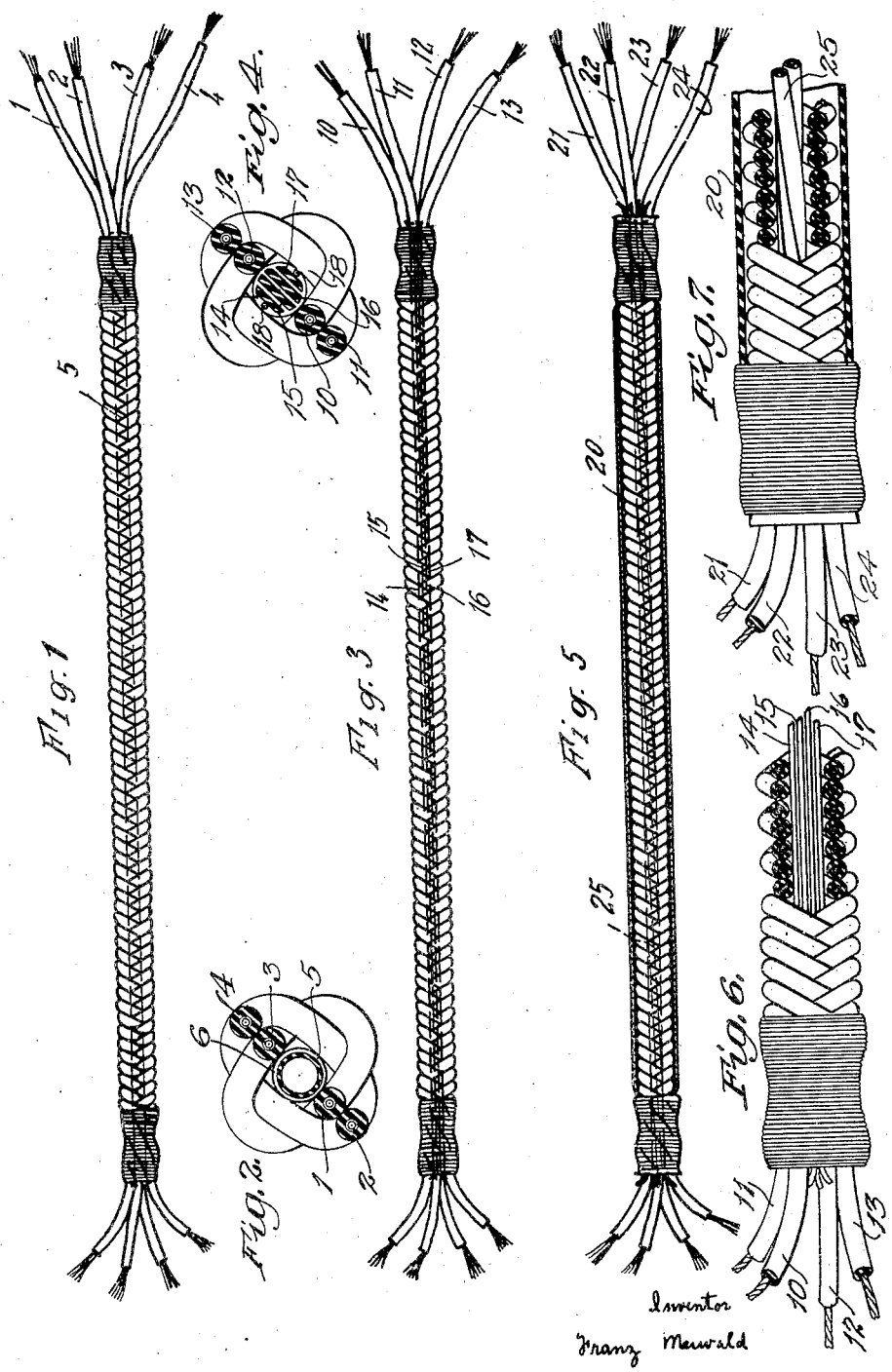

Patented Oct. 30, 1934

1,978,591

UNITED STATES PATENT OFFICE 1,978,591

ELECTRIC CABLE

Franz Meiwald, Vienna, Austria

Application March 18, 1933, Serial No. 661,434
In Germany March 24, 1932

5 Claims. (Cl. 173—264)

My invention relates to electric cables, and more particularly to a flexible cord for telephones. Flexible cords, such as cords for movable electrical apparatus, especially for telephones, require a certain length; i. e. the cord must be so long as to enable the operator to operate the apparatus without any hindrance from his position. If the telephone is not in operation; for instance, if the receiver is placed on the cradle, the cord hangs down in the case of the hitherto employed cords and is liable to kink, which complicates the operation of the apparatus, impairs the insulation of the cord and may damage the flexible cord. In order to avoid a kinking of the cords, it has already been proposed to arrange on the apparatus a winding device which automatically winds up the length of the cord in excess when the telephone is out of operation. These winding devices have, however, the drawback that the latter often jam the cords, thereby causing a locking of the winding device, so that the cord may easily be damaged.

The present invention has for its object to overcome the foregoing drawbacks. To this end, a cord is provided whose constituent conductors, protected preferably by braiding, are plaited or interwoven around a central flexible core, or whose conductors, braided, interlaced or interwoven are enclosed in an elastic tubular covering. The central flexible core may consist of one or more strips, cordlike elements or threads of rubber or of one or more rubber tubes. As central core or elastic tubular covering coiled springs may also be used to advantage. In order to protect the wire when in use from an undue stretching, means may be provided in connection with the cord for limiting the stretching; for instance cordlike elements or strips made of fibrous material in the case of a cord whose core consists of a rubber tube. With a central flexible core consisting of individual rubber strips, said cordlike elements or the like together with the rubber strips may be arranged inside the main cord.

In the accompanying drawing are illustrated several embodiments of the flexible cord made according to the invention.

Fig. 1 represents a side elevation of one form of the flexible cord.

Fig. 2 represents a transverse section through the cord, Fig. 1, in larger scale.

Fig. 3 represents a modified cord in side elevation.

Fig. 4 represents a transverse section through the cord, Fig. 3, in larger scale.

Fig. 5 represents a further modified form of cord in side elevation.

Fig. 6 represents in larger scale a partly longitudinal section of the cord modification, Fig. 3, and Fig. 7 represents in larger scale a partly longitudinal section of the cord modification, Fig. 5.

Referring to Fig. 1, this figure shows a longitudinal view of a four-conductor cord with a central flexible core. The four conductors are denoted by the numerals 1, 2, 3, 4. The central flexible core 5 is in this case a rubber tube. If the core, for instance, is used for telephones for connecting the casing and the receiver, the core is preferably so braided that when contracted it has a length which corresponds approximately to the distance between the casing and the receiver. The stretching of the cord is chosen in such a manner as to permit its extension to the operator's position. The rubber tube 5 is provided as shown in Fig. 2 in larger scale, with a braided covering 6, so as to limit its stretching, the bars of the braiding 6 being disposed, corresponding to the desired stretching, in a more or less inclined relation to one another.

Fig. 3 shows a cord according to the invention with a core consisting of a plurality of rubber strips. As shown in more detail in larger scale in Figs. 4 and 6, the individual conductors 10, 11, 12, 13 are braided around four rubber strips 14, 15, 16, 17. As means for limiting the stretching of the cord, wires 18 are arranged together with the core strips.

Fig. 5 shows a cord according to the invention placed in the rubber covering 20. As shown in detail in Fig. 7, the individual conductors 21, 22, 23, 24 are braided around a core 25 which limits the stretching. This core consists preferably of single cordlike elements, the ends of which are firmly attached to the end of the rubber covering.

I claim as my invention:

1. An extensible electric cord consisting of a plurality of individual insulated conductors at least equal in length to the maximum distance to be bridged by the cord, said insulated conductors being braided together to constitute a form-sustaining extensible tubular braid, shorter than said maximum distance, and an elastic means guided freely along said braid and being normally shorter than said maximum distance, said means being only at its ends connected to the ends of said braid and serving to normally hold said braid contracted.

2. An extensible electric cord consisting of a plurality of individual insulated conductors at least equal in length to the maximum distance to be bridged by the cord, said insulated conductors being braided together to constitute a form-sustaining extensible tubular braid, shorter than said maximum distance, and an elastic means normally shorter than said maximum distance, said conductors being braided freely around said means, and being connected only at their ends to the ends of said elastic means, so that the latter normally serves to hold said braid contracted.

3. An extensible electric cord consisting of a plurality of individual insulated conductors at least equal in length to the maximum distance to be bridged by the cord, said insulated conductors being braided together to constitute a form-sustaining extensible tubular braid, shorter than said maximum distance, and tubular elastic means normally shorter than said maximum distance and freely surrounding said braid and being only at its ends connected to the ends of said braid, and serving to normally hold said braid contracted.

4. An extensible electric cord consisting of a plurality of individual insulated conductors at least equal in length to the maximum distance to be bridged by the cord, said insulated conductors being braided together to constitute a form-sustaining extensible tubular braid, shorter than said maximum distance, and at least one length of elastic rubber guided freely within said braid and being normally shorter than said maximum distance, said rubber length being only at its ends connected to the ends of said braid and serving to normally hold said braid contracted.

5. An extensible electric cord consisting of a plurality of individual insulated conductors at least equal in length to the maximum distance to be bridged by the cord, said insulated conductors being braided together to constitute a form-sustaining extensible tubular braid, shorter than said maximum distance, and at least one spiral spring guided freely within said braid and being normally shorter than said maximum distance, said spring being only at its ends connected to the ends of said braid and serving to normally hold said braid contracted.

FRANZ MEIWALD.